March 2, 1965 — P. L. ALGER ETAL — 3,171,996
STATOR AIR DUCT DESIGN

Filed Jan. 7, 1960 — 2 Sheets-Sheet 1

Inventors
Phillip L. Alger
Robert L. Wall
by James R. Campbell
Their Attorney

March 2, 1965  P. L. ALGER ETAL  3,171,996
STATOR AIR DUCT DESIGN

Filed Jan. 7, 1960  2 Sheets-Sheet 2

INVENTORS
PHILLIP L. ALGER
ROBERT L. WALL
BY
ATTORNEY

United States Patent Office 3,171,996
Patented Mar. 2, 1965

3,171,996
STATOR AIR DUCT DESIGN
Philip L. Alger, Schenectady, and Robert L. Wall, Ballston Lake, N.Y., assignors to General Electric Company, a corporation of New York
Filed Jan. 7, 1960, Ser. No. 1,065
9 Claims. (Cl. 310—51)

The invention described herein relates to dynamoelectric machines and more particularly to an improved design of stator air ducts for minimizing the sound level of noise radiated by a motor or generator.

The use of motors and generators in environments requiring quiet operation for permitting safe operation of associated systems, improving worker efficiency, and the like, demands that the sound level of radiated noise be kept at a minimum. A major source of noise in motors originates in the air gap and in the radial air ducts positioned along the axial length of both the rotor and stator. As a general proposition, the noise produced takes the form of a siren noise resulting from the rotor conductor bars rapidly cutting off and turning on air flow from the rotor into the aligned stator air ducts positioned across the machine air gap. The alternating fluctuation of air then imparts a pulsating effect to the mass of air in the stator duct. When the frequency of the pressure pulsations thus produced by the rotor is the same as the natural frequency of the stator air duct, resonance occurs with consequent production of noise of high intensity.

In an attempt to minimize the establishment of such noise, many diverse constructions have been used to reduce the siren effect created by the rotor and the noise emanating from the stator air ducts. For example, those portions of the ducts leading into the air gap have been provided with streamlined contours in order to obtain a substantially unimpeded flow of air across the air gap. In other cases bars have been moved inwardly towards the rotor bore, but in doing so, the bars are drawn closer together, thereby restricting the opening therebetween and the amount of air which otherwise could flow toward the air gap. Changes in design of this character are not desirable because the primary function of the air is to cool the parts and the maximum amount of air available should be circulated through the rotor core. Externally positioned mufflers have been suggested and although this constitutes an effective means for attenuating the sound noises, the mufflers are bulky and expensive and generally are permissible only in those instances where extreme quiet is an important requirement in the system. A multitude of other changes have ben employed but they do not provide benefits of the desired degree.

Probably the most successful construction used for minimizing the generation of sound noises is that disclosed in the copending patent application of P. L. Alger, Serial No. 632,528, filed January 4, 1957, and entitled "Intermediate Ring Squirrel Cage Rotor," now Patent No. 2,944,171, and assigned to the same assignee as the present invention. In that application, special types of punchings are used in the rotor which permit the use of conductor a lesser number of bars crossing the air ducts that there are conductor bars in the rotor. This is accomplished by selecting a slot design for the special punchings at the air ducts such that more than one conductor bar forms the duct bar where they cross the air duct. Because of the design inherent in the Alger construction, the duct bars can be moved inwardly while still allowing the same or even greater air flow than that possible in previous constructions. Moreover, great latitude is available in conforming the duct bars to a desired shape and in varying their number around the rotor periphery. Therefore the pressure pulsations produced by such a rotor can be selected prior to its manufacture by utilizing a number of air duct bars which when coupled with the rotor speed, will produce the least objectionable frequency generated by the machine, and thereby avoid reasonance.

Recent evidence obtained from the testing of motors indicates that the stator air ducts contribute substantially to the total sound level of noise radiated by the motor during operation, especially under conditions of resonance. The invention described herein accordingly has as one of its objectives, a reduction in the sound level of noises radiated by a dynamoelectric machine.

Another object of our invention is to provide a design of stator air ducts wherein the point of maximum frequency response will not coincide with an exciting frequency generated in other parts of the motor.

In carrying out our invention in one form, we select the frequencies generated by a rotor for a particular machine, as determined by the number of rotor slots times revolutions per second and multiples thereof, and compare them with the frequency response curves for ducts expected to be used in the stator. If the generated and response frequencies coincide, a high noise level will be produced and in order to provide relatively low noise levels, the ducts then are redesigned to have a resonant frequency falling outside the area of coincidence, thus ultimately producing sound noises of low intensity. Since the duct width and depth parameters generally are fixed, latitude in design is provided by varying the duct length by changing the lengths of space blocks, which when incorporated in the duct, effectively establish the desired frequency response. In view of the varying space block designs illustrated herein, it will be apparent to those skilled in the art that different duct configurations may be obtained by utilizing a multitude of different space blocks for obtaining a frequency response compatible with low sound noise levels.

The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawing in which:

Figure 1:
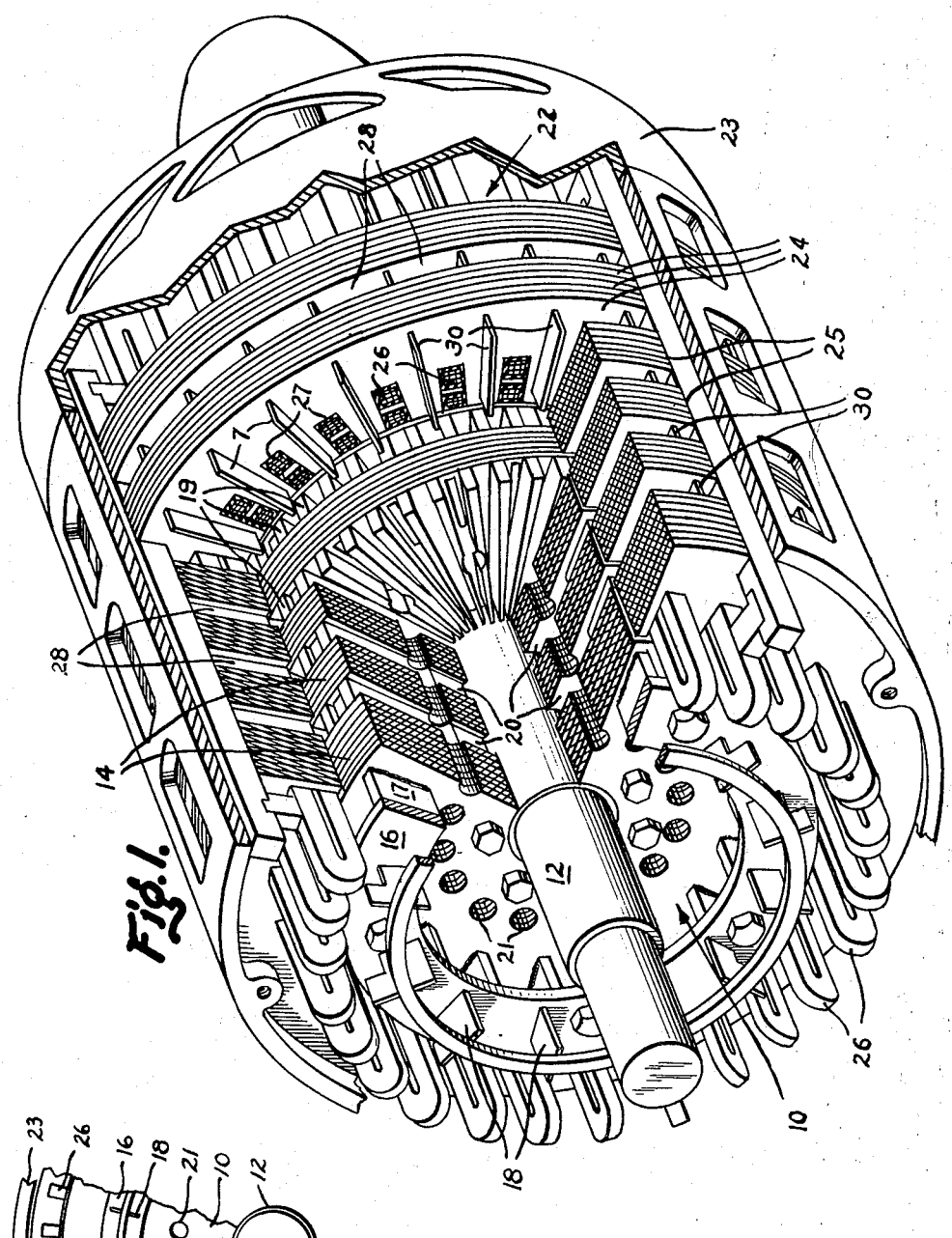
FIGURE 1 is a perspective view of a motor, with parts broken away and in section, illustrating the arrangement of space blocks in the stator.

Referring now to the drawings wherein like reference characters designate like or corresponding parts throughout the several views, there is shown in FIGURE 1, a motor comprising a rotor 10 including a shaft 12 supporting laminations 14 having a cast or bar winding in slots (not shown) disposed therein. End rings 16 integrally connected with the bar conductors 17 of the winding are positioned on opposite ends of the rotor and have fan blades 18 mounted thereon in the usual manner. Since the rotor illustrated is of a conventional squirrel cage design, the cast conductors forming the winding are not visible because the slots are closed to the rotor surface. As shown, a multitude of air ducts 20 are opened to the rotor surface and are formed during the manufacturing operation by locating space blocks 19 between sections of laminations along the length of the rotor in a manner well known in the art. The axial bar conductors of the winding bridge the air ducts formed by space blocks between the laminated sections. If a rotor of the design in the Alger copending application is used, the number of conductor bars across the duct can be made less than the conductor bars comprising the winding. Air is introduced at each end of the rotor through openings 21 and is caused to flow axially prior to discharge radially through the ducts 20 which open to the rotor surface.

The stator 22 is positioned in frame 23 of conventional construction and includes laminations 24 assembled in sections 25 to form the stator core. Coil conductors 26 are disposed in slots 27 therein in the usual manner all of the coils thus comprising the winding for the stator. Each section 25 is spaced from the next section by space blocks 30 brazed or otherwise secured to the flat surface of one of the laminations 24. In the cut-away view, the space blocks 30 between adjacent sections are shown in full for illustration purposes. When the stator is assembled, the exposed end surfaces of the space blocks abut against the flat surface of the last lamination in the adjacent section 25 thus forming a multiplicity of radially directed spaces or ducts 28 extending circumferentially around the stator. Each duct 28 is thus formed by the facing sides 7 of two space blocks 30 and the facing surfaces of the spaced laminations. As shown, the stator ducts 28 are radially aligned with the air ducts 20 in the rotor, the arrangement being such that when the rotor rotates, air flows axially inward through openings 21 in the rotor prior to being discharged radially outward through air ducts 20 and across the motor air gap into the aligned ducts 28 in the stator. It then is discharged to the atmosphere by flowing between the inner surface of the frame and the stator, as more fully described hereafter. The difference in this motor over that of the prior art resides in the size and disposition of space blocks used in forming the air ducts in the stator for reducing the sound level of noise generated by the motor during operation.

Figure 2:
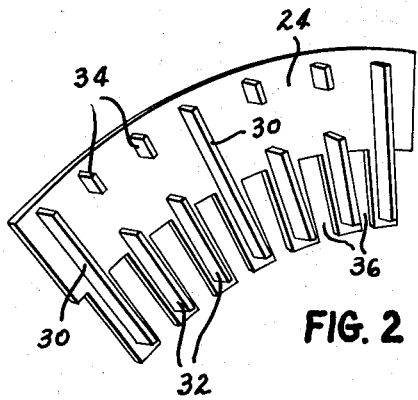
FIGURE 2 illustrates a portion of a silicon steel punching for a stator showing the disposition of space blocks on the punching.

As shown in FIGURES 1–6 the space blocks are of different design and are welded or otherwise affixed to the surface of stator laminations 24. As more fully described hereinafter the space blocks are designed to a particular size in order to obtain the desired frequency response in each air duct. As shown in FIGURE 2, space blocks 30 are interrupted in a circumferential direction by shorter space blocks 32 radially spaced from buttons 34 welded adjacent the surface of the laminations. As in conventional constructions, conductors 26 are arranged for positioning within the slots 36 which extend axially of the machine.

Figure 3:
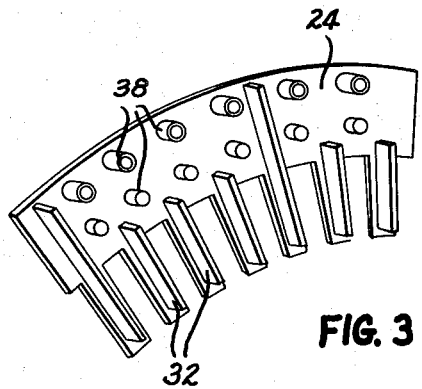
FIGURE 3 is a modification showing the use of cylindrical elements for spacing the laminations.

The modification of FIGURE 3 is substantially the same as that of FIGURE 2 except that the buttons 38 are cylindrical rather than of rectangular configuration and they are spaced out of radial alignment with the space blocks 32 attached to the teeth of the lamination.

Figure 4:
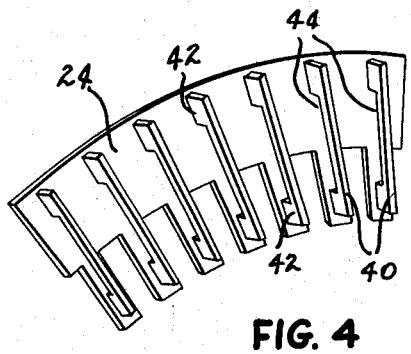
FIGURE 4 is another modification showing a portion of the space blocks cut away for the purpose of reducing the sound level of noise in the duct.
Figure 5:
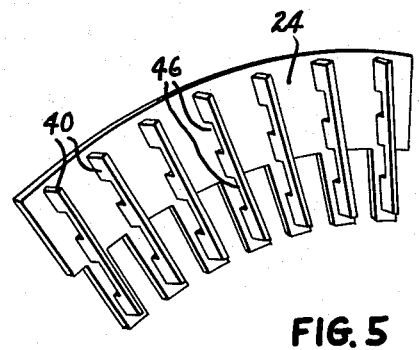
FIGURE 5 is a modification similar to FIGURE 4 showing the space block broken along its length.

The design of FIGURE 4 includes singular space blocks 40 welded or otherwise affixed at 42 to the surface of the lamination 24. These space blocks are cut away as at 44 to provide an opening between the space block and the adjacent surface of the lamination 24. FIGURE 5 is similar to FIGURE 4 except the space blocks 40 are interrupted at a plurality of points 46 along the space block length.

Figure 6:
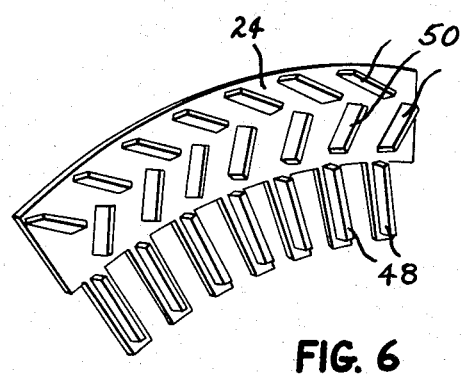
FIGURE 6 is still another modification illustrating space blocks for causing air to follow a circuitous path in the machine.

In FIGURE 6, the space blocks 48 are of the same length as the teeth and serve to channel the air between space blocks 50 which are attached to the exposed surface of the lamination 24 in a zigzag pattern so that the air is caused to travel a circuitous path before leaving the stator.

In considering the design of the rotor for the purpose of minimizing the sound level of noise normally radiated therefrom, it has been noted that the fundamental frequency established by the rotor will be equal to the product of the number of rotor conductor bars and the r.p.s. of the rotor. In conventional constructions of rotors, this frequency cannot be changed for a particular motor rating because a predetermined number of conductor bars are needed for motor operation, and the design of the rotor is such that the bars must pass axially through the air ducts in the rotor. The only known variation in construction is that disclosed in said patent wherein the number and shape of conductor bars crossing the air duct can be varied in addition to being able to change the bar radial position in the rotor. The flexibility in design thus made possible effectively permits designing the rotor to have it generate frequencies of the desired value.

The stator air duct width is determined by the spacing of the conductors in the stator core while the depth is governed by the size of the space blocks which, in most machines, is limited. The length can be varied however since the function of the space block normally is to hold the laminations apart and accordingly provide a space therebetween for accommodating the ventilating air which flows radially out of the core. The fact of radial length variation is important because it permits reducing the sound level of noise radiated by the machine.

The passageway in the stator ventilating duct, with air in at the air gap and flowing radially up the side of one tooth to the outer diameter of the core, may be considered as an organ pipe. The following theory applies to organ pipes but it also is applicable to the stator duct design and is incorporated herein to illustrate how to arrive at the resonant frequency of a duct and how to design the duct in order to avoid the coincidence of a resonant and exciting frequency. It will be understood however that it does not include a calculation of the magnitude of the response but indicates only the frequency at which the maximum response will occur.

The wavelength of such a duct or pipe is expressed in radians by the formula:

(1) $$kh=\frac{2\pi h}{\lambda}=0.45\left(\frac{fh}{1000}\right) \text{radians}$$

where $h$ = radial length of duct in inches,
$\lambda$ = length of sound wave in inches,
$= \frac{14,000}{f}$ inches at 40 C,
$f$ = frequency of sound wave in cycles/sec.

If this wavelength is $\pi$, or 180°, the duct will be in resonance, when the frequency will be $$\frac{1000\pi}{.45h}=\frac{7000}{h} \text{c.p.s.}$$

and the noise produced will be extremely loud. If, on the other hand, the length of the duct is more than 30° away from resonance, the sound noise level will diminish substantially.

Therefore, to obtain a low noise machine, the radial length of each stator duct should be selected so that it is not near resonance, i.e., that:

(2) $$\frac{6000}{f} > h > \frac{8000}{f} \text{ inches, approximately}$$

In this equation, $f$ must be considered, first, as the fundamental of the duct frequency, $f_1$, as established by the number of rotor bars times the speed in revolutions/sec.; and secondly, as the second harmonic of the duct frequency, $f_2=2f_1$, or twice the rotor bars times revolutions/sec. If $h$ is chosen to be greater than $8000/f_1$, it will be evident that the duct noise will go through resonance as the rotor accelerates to operating speed.

Therefore, $h$ preferably should be made less than $3000/f_1$, whereby from Eq. 1, $kh$ will be less than 75° for the fundamental, and less than 150° for the second harmonic; or else $h$ should be made equal to about $5000/f_1$, so that $kh$ will be equal to approximately 130° for the fundamental and 260° for the second harmonic.

Considering noise produced by the stator, pressure pulsations are generated by the rotor as the rotor bars pass the stator ducts and alternately cut off and turn on air flow. These pressure pulses are impressed on the radial air column in each stator duct so that the air therein is caused to pulsate at a fundamental frequency equal to that generated by the rotor. When the frequency of pulsation coincides with the resonant frequency of the duct, maximum noise will be produced by the machine. Therefore, minimum levels of noise will be radiated by the machine when the natural frequency of the stator duct varies substantially from the frequency of the pressure pulsations generated by the rotor during operation. The stator air duct has been likened to an organ pipe, as discussed previously, wherein the resonant frequency is inversely proportional to the length. Accordingly, as the size of a motor increases, and also the radial length, $h$, of the space blocks, the resonant frequency, $$\frac{7000}{h}$$

decreases in inverse ratio. However, the greater the size of the motor, the greater the number of rotor slots, so that as the size and speed of a motor increase, the impressed air pulsation frequency increases also. Thus, for a small or low-speed motor, the resonant frequency of the stator air ducts will be above the impressed pulsation frequency, but for large and high-speed motors, the resonant frequency will be below the impressed frequency. At some intermediate size and speed of motor, the impressed and resonant frequencies will be nearly the same, and so the motor will produce a high noise level, unless this is prevented by design methods such as those described herein.

A 6-pole, 250-H.P., 1200 r.p.m., 3 phase, 440 volt motor was tested in which the radial length of a stator tooth was 2.31", and that of the core behind the tooth 1.56". The radial space blocks in the core were cut short by ⅜", so that the overall length of the duct was 3.50". The corresponding wavelength of this duct for a frequency $f$ is, by Formula 1, $$(3) \qquad \frac{1.57f}{1000} \text{radians}$$

A window punching (w.p.) rotor of the type disclosed in said patent was equipped with 56 duct bars and operated in the above stator. The duct noise frequencies were 1120 and 2240 cycles, respectively; for the fundamental and second harmonic. The corresponding wavelengths are 1.76 radians and 3.5 radians.

This w.p. rotor, therefore, has wavelengths of 101° and 202° for the fundamental and the second harmonic.

Tests made on the stator indicate that the resonant frequency was about 2250 cycles. Putting $$f = 2250$$
$$h = 3.5'' \text{ and}$$
$$kh = \pi$$

in Eq. 1, indicates that the coefficient of Eq. 1 should be about .40, instead of the theoretical value of .45.

Using a coefficient of .40 and taking the case of the w.p. rotor, with 56 duct bars, the fundamental duct frequency is 1120 cycles, and the optimum radial length of space block is less than 3", or close to 5" in the case of the second harmonic. The latter value could be obtained by bending the space blocks behind the slots at a steep angle as illustrated in FIGURE 6, to increase the length of path in the core.

Therefore, if the space blocks in the core were shortened to 2⅝" instead of the 3½" dimension mentioned above, the resonant frequency of the ducts would be raised from 2250 to 3000 cycles, making the wavelength for the fundamental of the w.p. rotor duct noise almost 67°, and that for the second harmonic only 135°, thus producing a very quiet motor. It is to be noted that with this design of stator, a standard motor having 76 rotor bars and a 1520 cycle impressed fundamental duct frequency, would have a wavelength of 90° for the fundamental, and 180° for the second harmonic, which would establish an extremely loud 3000 cycle noise; whereas the w.p. rotor is extremely quiet at all frequencies.

In view of the above, it is apparent that an effective solution to duct noise is (1) to select the number of rotor bars across the ducts at as low a value as feasible; and (2) to make the radial length of the stator duct air passages such that the value of $kh$ from Eq. 1 will be in the neighborhood of 1.0.

By utilizing these teachings, many different designs and configurations of space blocks may be employed for obtaining the desired frequency response in the stator air ducts. FIGURES 2–6 illustrate different constructions that may be used for this purpose. Although the configuration of FIGURES 4 and 5 are not broken throughout the radial length, the openings 44 and 46 may be used for changing the frequency of response in the air ducts, since as indicated above, the duct is designed from the standpoint of an organ pipe.

Another important advantage derived from the construction disclosed herein is that the air can be caused to follow a flow pattern peripherally around the stator core rather than radially, as in the prior art. It has been customary for many years to provide for radial flow only but when peripheral flow was desired, an additional air space was provided between the stator core and the inner surface of the frame. Movement of air was then accomplished by air pressure differentials between the core and frame. In some cases, the space therebetween was made sufficiently large to receive deflectors which caused the air to assume a peripheral flow pattern.

Since the space blocks of our invention can now be terminated short of the stator core outer diameter, the air can flow peripherally in the core and in that area defined by the outer ends of the space blocks and the core outer surface. Moreover, the air can be directed positively in a peripheral direction by utilizing short spacers of the type illustrated in FIGURE 5, but all turned in the same direction. Differences in air pressure at the discharge end of the ducts and the exit from the machine also permits moving the air in the core in the desired direction. Obviously, it could flow in opposite directions on each side of the machine.

Figure 1A:
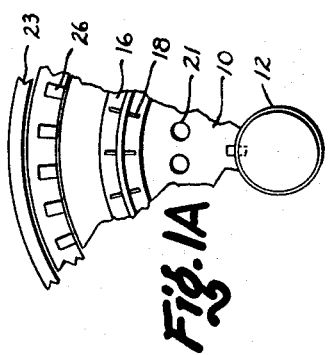
FIGURE 1A is a view showing the peripheral surface of the stator core spaced from the inner surface of the machine frame.

By utilizing this kind of construction, the frame can be made smaller since it can be placed in full surface contact with the core, as shown in FIG. 1, or spaced a short distance therefrom, as illustrated in FIGURE 1A thus effecting a savings in material in addition to reduction in machine physical size, which in some cases, is of great importance. The use of suitable fan and other air pressure arrangements can cause peripheral flow at high velocities within the core depth, thereby securing improved cooling of the machine even though the frame depth is less than that now necessary for adequate cooling.

Obviously, a stepped or off-center arrangement may be used in the ducts, as well as acoustic filters which are designed to resonate at the same frequency as the exciting frequency.

It is apparent that many modifications and variations are possible in light of the above teachings. It therefore is to be understood that within the scope of the appended claims, the invention may be practiced other than as specifically described.

What we claim as new and desire to obtain by Letters Patent of the United States is:

1. A low noise motor comprising a frame enclosing a stator and a rotor, each including a magnetic core having conductor bars comprising a winding and radially disposed air ducts therein, said rotor including a less number of bars crossing said air ducts than the number of conductor bars in the rotor, thereby to provide air pressure pulsations of a predetermined frequency when the rotor is operated in the stator, said stator including space blocks for forming the stator air ducts, said space blocks being located on each of the stator core teeth and extending outwardly a distance sufficient to cause each duct to have a wavelength of at least 30° away from resonance on either side so that during operation the pressure pulsations cause the mass of air in the air ducts to pulsate at a frequency having a wavelength different than the wavelength of the stator ducts.

2. A low noise motor comprising a frame enclosing a stator and a rotor,
   each including a magnetic core having bar conductors forming a winding therein,
   radially extending air ducts in the rotor and stator aligned with each other for permitting ventilating air to flow through the rotor and across the air gap into the stator prior to being discharged from the motor,
   said rotor creating air pressure pulsations in the stator air ducts at predetermined frequencies as the air flow from the rotor into the stator air ducts is alternately turned off and on during motor operation,
   means in the stator defining said stator air ducts being of a size and configuration sufficient to establish a resonant frequency for the stator air ducts different than the pressure pulsation frequencies generated by the rotor,
   thereby producing a level of sound noise from the motor lower than that emanating therefrom when the pressure pulsation frequencies coincide with the resonant frequencies of the stator air ducts.

3. The combination according to claim 2 wherein said means defining the stator air ducts includes space blocks attached to the magnetic core teeth and extending a length toward the stator outer diameter sufficient to form air ducts having a response frequency different than those of the pressure pulsations generated by said rotor.

4. The combination according to claim 3 wherein the space blocks attached to the magnetic core teeth impart a response frequency to the air ducts at least 30° either side of resonance to provide a motor having a low noise level output.

5. The combination according to claim 3 wherein the inner surface of said frame is in contact with the stator core, and the air is caused to move in a peripheral direction in the stator core upon being discharged from the area defined by the stator space blocks.

6. The combination according to claim 3 wherein the inner surface of said frame is out of contact with the stator core outer surface thereby to provide a space therebetween, and means in said core for directing air in a direction peripherally thereof when it leaves the areas defined by the stator space blocks.

7. The combination according to claim 3 wherein the space blocks extend a portion of the distance between the stator inner and outer diameter, and spacing elements positioned between the ends of the space blocks and the surface of the core.

8. The combination according to claim 3 wherein the space blocks have longitudinal openings disposed in the radial length of each space block and so chosen as to adjust the air resonance frequency to a value different from the frequency of the pressure pulsations impressed by the rotor.

9. The combination according to claim 3 wherein the space blocks are located on the stator core teeth, and spacing elements are located outwardly therefrom and are positioned at an angle to a plane passing through the rotor axis thereby to cause the air to travel a circuitous path prior to discharge from the stator.

References Cited by the Examiner

UNITED STATES PATENTS

| | | | |
|---|---|---|---|
| 854,717 | 5/07 | Coffman | 310—65 |
| 933,737 | 9/09 | Baird | 310—65 |
| 973,565 | 10/10 | Reist | 310—64 X |
| 1,022,021 | 4/12 | Farquhar | 310—65 |
| 1,196,345 | 8/16 | Field | 310—65 |
| 1,913,138 | 6/33 | Apple | 310—65 |
| 2,956,186 | 10/56 | Wall | 310—65 |

MILTON O. HIRSHFIELD, *Primary Examiner.*

ORIS L. RADER, *Examiner.*